United States Patent [19]

Baumann

[11] 4,200,896
[45] Apr. 29, 1980

[54] METHOD AND SYSTEM FOR CONTROLLING A MULTI-SEGMENT INDICATOR TO FURNISH AN ANALOGUE DISPLAY INDICATING ONLY THE RELATIONSHIP OF THE MEASURED VALUE TO A DESIRED VALUE OR RANGE OF VALUES

[75] Inventor: Arthur Baumann, Zurich, Switzerland

[73] Assignee: Mettler Instrument AG, Greifensee-Zurich, Switzerland

[21] Appl. No.: 935,368

[22] Filed: Aug. 21, 1978

[30] Foreign Application Priority Data

Aug. 26, 1977 [CH] Switzerland ............ 10430/77

[51] Int. Cl.² .................. G09F 9/32; G06F 15/20
[52] U.S. Cl. .................. 364/570; 340/715; 340/756; 364/567
[58] Field of Search .............. 364/570, 567, 568; 340/753, 756, 762, 793, 701–715; 177/210 R, 210 EM, 25; 324/98

[56] References Cited

U.S. PATENT DOCUMENTS

| | | | |
|---|---|---|---|
| 3,626,367 | 12/1971 | Howard et al. ............ | 340/706 |
| 3,653,015 | 3/1972 | Rock ........................ | 177/25 |
| 3,788,410 | 1/1974 | Allenspach et al. ........ | 177/25 |
| 3,868,673 | 2/1975 | Mau, Jr. et al. ........... | 340/709 |
| 3,914,758 | 10/1975 | Ingle ........................ | 340/756 |
| 4,040,048 | 8/1977 | Lien ......................... | 340/711 |
| 4,055,753 | 10/1977 | Rogers et al. .............. | 177/25 |

*Primary Examiner*—Felix D. Gruber
*Assistant Examiner*—Gary Chin
*Attorney, Agent, or Firm*—Marianne Rich

[57] ABSTRACT

The multi-segment indicator can be selectively switched to operate as a range display. For this purpose, the vertical segments are deactivated. Each digit in the multi-segment indicator has a top, bottom and middle horizontal segment. If the measured value is, respectively, less than equal to or greater than a desired value, all bottom, middle, and top segments, respectively are activated. Alternatively, all middle segments are activated if the measured value is within a desired range, the top and bottom segments being activated if the measured value is, respectively, greater than the upper limit of the range or less than the lower limit of the range. The sign of the measured, desired, and limiting values is considered before activation of the corresponding horizontal segments.

20 Claims, 8 Drawing Figures

METHOD AND SYSTEM FOR CONTROLLING A MULTI-SEGMENT INDICATOR TO FURNISH AN ANALOGUE DISPLAY INDICATING ONLY THE RELATIONSHIP OF THE MEASURED VALUE TO A DESIRED VALUE OR RANGE OF VALUES

The present invention relates to measuring apparatus with a multi-segment digital display. Although seven segment indicators having, in general, three substantially horizontal and four substantially vertical segments are presently most often utilized, the present invention is not to be restricted to these. Any multi-segment indicator, as well as indicators wherein numbers are formed by dots arranged in predetermined directions, is to be included within the scope of the present invention.

BACKGROUND AND PRIOR ART

Digital displays have the advantage of furnishing an unequivocal indication of the measured value without the necessity of interpolation. However digital displays are not particularly suitable when changes in the measured value are to be noted. For such applications, it has up to now been necessary to add an analogue instrument to the digital display. The use of two indicators or displays increases both the cost of the equipment and the required space.

A particular field of application of the present invention is the field of electronic scales. The problem it solves arises, for example, when a substance on the scale is to be increased until its weight reaches a desired value. Other applications include any measuring instrument in which rapid changes in the indicated value must be noted by the operator and/or when some manipulation by the operator must result in the achievement of a predetermined desired value. This problem can, for example, arise in machine tool operation when the path of a member of the apparatus is prescribed and any deviations from the path are to be noted. The present invention can also find application in those cases in which it must only be determined whether a measured value is below, within, or above a predetermined value range. Under all such circumstances a digital display constitutes an unnecessary strain or cannot be interpreted at all.

SUMMARY OF THE INVENTION

It is an object of the present invention to utilize a digital indicator also as a range or display as discussed above, thereby overcoming all the above-mentioned difficulties.

The invention is also to be utilized for any type of multi-segment display, independent of whether such display utilizes liquid crystals, light emitting diodes or other components.

Briefly, the present invention constitutes apparatus for temporarily deactivating selected ones of the segments of the digital display and activating the remaining ones of said segments in accordance with the measured value. In a preferred embodiment, said selected ones of said segments comprise the vertical segments, while the remaining ones of said segments comprise the horizontal segments.

In one preferred embodiment a first and second comparator means is furnished, respectively defining an upper and a lower limit for a predetermined range. All bottom, middle, and top horizontal segments of the digital display are then activated when the measured value is, respectively, below, within and above the range.

In a second preferred embodiment, subtraction means are provided which form a difference signal corresponding to the difference between a predetermined reference value and the measured value. The difference signal is then compared to a reference signal. The result of the comparison is utilized for selective activation of either top, the middle, or bottom horizontal segments of the digital indicator. A clear display of whether the measured value is above, the same as, or below the reference value results.

In a still further preferred embodiment, the apparatus according to the present invention is embodied in a microcomputer.

The present invention both as to its construction and its method of operation, together with additional objects and advantages thereof, will best be understood from the following description of preferred embodiments when read in connection with the accompanying drawing.

Although electronic scales are utilized for the embodiments to be discussed, the invention is not, as previously mentioned, to be restricted to such scales. Further, the type of scale is unimportant. It is merely necessary that the measured value is furnished in digital fashion and that a multi-segment indicator for representing the digital result is provided.

Conventional scales as described above can be found in U.S. Pat. No. 3,786,884 (scales utilizing electromagnetic compensation) and U.S. Pat. No. 3,788,410 (scales utilizing vibrating strings).

Figure 1:
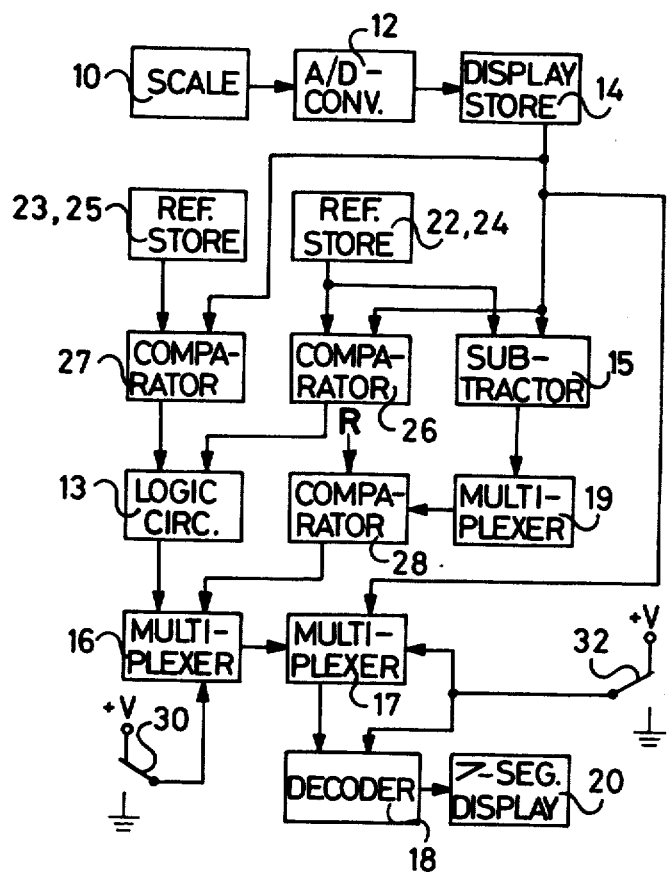
FIG. 1 is a generalized block diagram of the circuit of the present invention.

The embodiment shown in FIG. 1 is operable in three ways. First, it is operable to furnish the normal digital display. Secondly, a simplified display can be furnished which is indicative only of the relationship between the measured value and a predetermined desired value. Thirdly, a range display can be provided which indicates whether the measured value is within, above, or below a predetermined range.

Referring now to FIG. 1, reference numeral 10 indicates a scale to the output of which is connected an analogue-digital converter 12. Display store 14 stores the value, i.e. measured value in digital form. For scales which furnish the measured value in digital form, the analogue-digital converter can be omitted. Further, a tare apparatus can precede the display store. For the known digital display, the measured value stored in display store 14 is transferred through multiplexer 17 and decoder 18 to a seven segment indicator 20.

Inputs 22, 23 are provided for allowing a desired upper and a lower limit value to be inputted to the system. Inputs 22 and 23 are connected to reference stores 24 and 25 respectively. The desired lower limit value is stored in reference store 25, while the desired upper limit value is stored in reference store 24. Comparators 26 and 27 compare the measured value to the desired upper and lower limit values and furnish signals resulting from the comparison to a logic circuit 13. The output of logic circuit 13 is connected to a multiplexer 16. A subtraction circuit 15 computes the difference between the upper limit value in reference store 24 and the measured value and furnishes the resulting difference signal through multiplexer 19 to a comparator 28. In comparator 28 the difference signal is compared to a reference value (e.g. zero), and the result of the comparison is applied to multiplexer 16. A mode selector switch 30 is activated to determine whether a single value comparison or a range determination is to be carried out. Operation of selector switch 32 determines whether the standard digital display or a display according to the invention is to be furnished.

Figure 2:
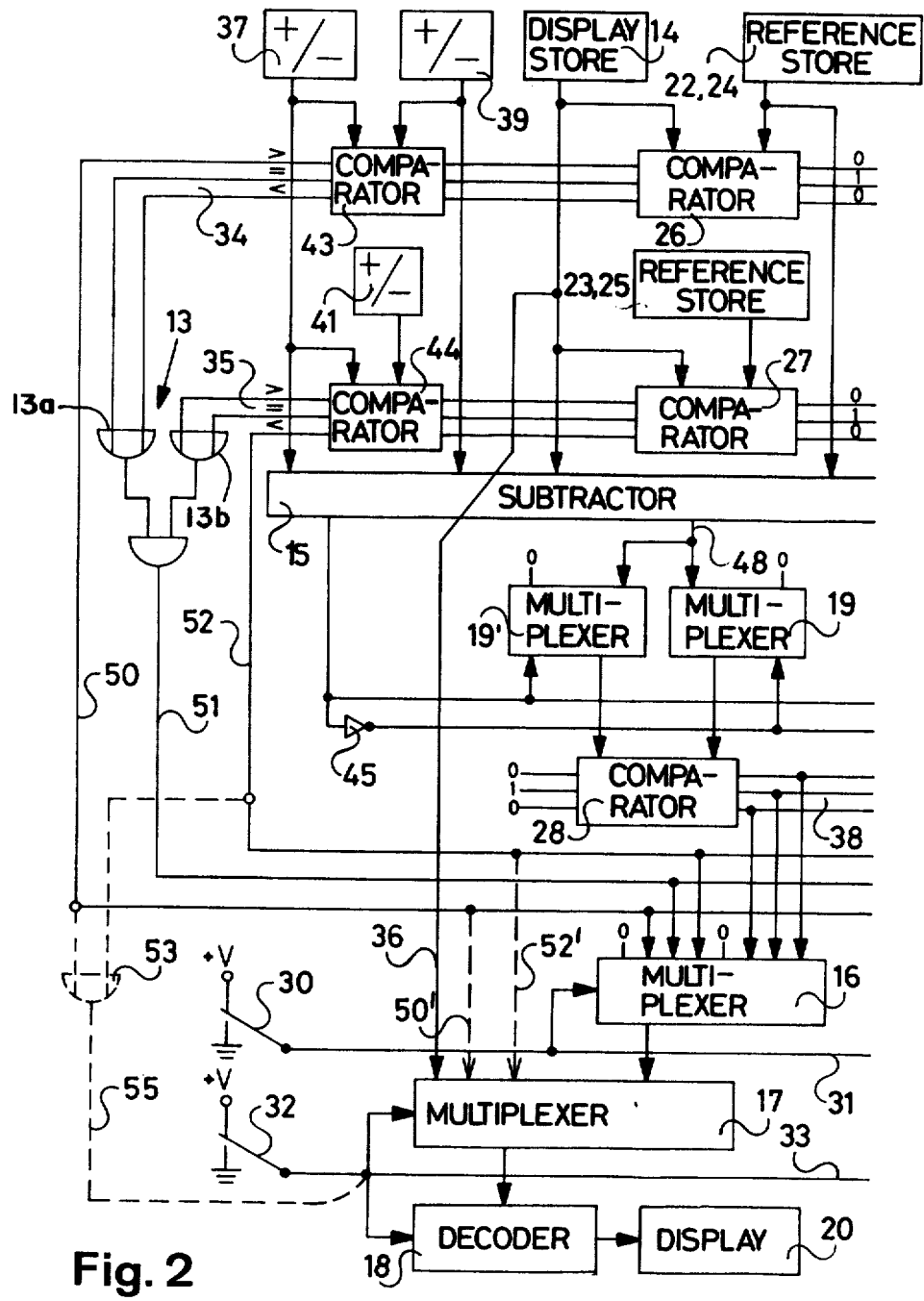
FIG. 2 is a more detailed block diagram of a selected decimal place in the multiplace display of the embodiment of FIG. 1.
Figure 2A:
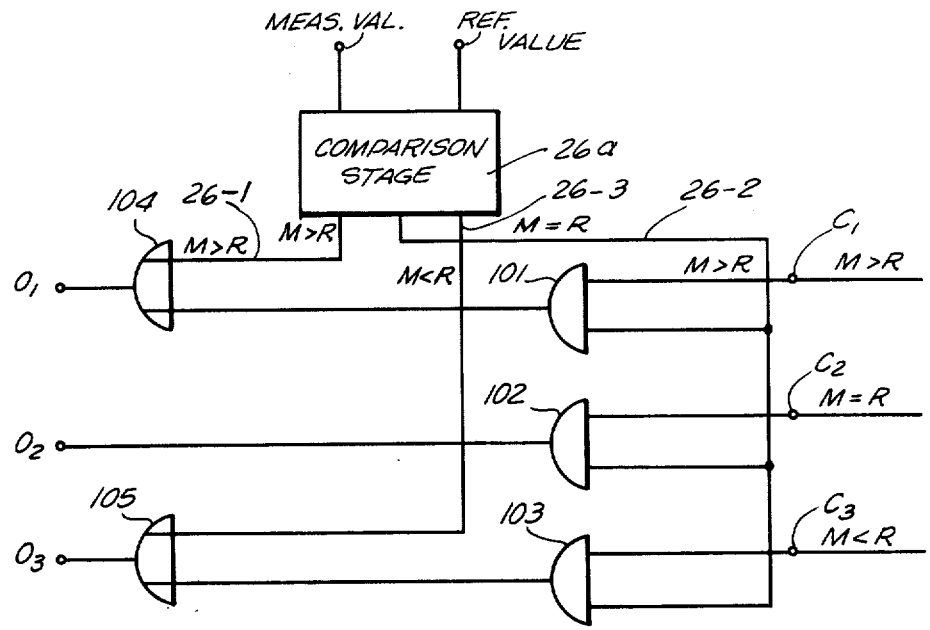
FIG. 2a is a block diagram of one stage of either comparator 26 or 27 of FIG. 2.

FIG. 2 shows a single place (e.g. decimal place) of a multiplace display and the required control circuits. Except as otherwise noted, each element in FIG. 2 is duplicated for the remaining places in the display. Thus there is a comparator stage 26 and a comparator stage 27 for each place in the display. The individual comparator stages are connected to each other in cascade, that is the output of each stage is connected by three lines (34, 35) to control inputs of the next following stage. A "1" control signal at the top input of each stage signifies that the measured value was greater than the reference (i.e. desired) value up to and including the last previous stage, while a "1" signal at the middle or bottom input, respectively, signify that the measured value was, respectively, equal to or less than the reference value. The cascaded stages of comparators 26 operate from right to left, that is from the least significant place to the most significant place. Comparator stages 27 operate in like manner. The control inputs of the lowest stage of comparators 26 and 27 are each energized as shown in FIG. 2, that is the top control input receives a "0" signal, the middle input "1" signal and the bottom input a "0" signal. Each comparator stage 26, 27 energizes its top output when the measured value exceeds its reference value, and its bottom output when the measured value is less than its reference value. When the comparison indicates equality, the output energized corresponds to the energized input. FIG. 2a shows the logic circuits that must be included in each comparator stage to carry out the above-described operation. A comparison stage 26a has an output 26-1 which carries a "1" signal when the measured value exceeds the reference value, an output 26-2 which carries a "1" signal when the measured value is equal to the reference value, and an output 26-3 which carries a "1" signal when the measured value is less than the reference value. Terminals C1, C2, and C3 are connected, respectively, to the top, middle and bottom outputs of the previous comparator stage. A "1" signal at terminal C1, C2, or C3, respectively, thus indicates that the measured value was greater than, the same as or less than the reference value up-to and including the last previous stage. Terminals C1, C2, and C3 are connected, respectively, to the first inputs of AND gates 101, 102, and 103. The second inputs of these AND gates are connected in common to output 26-2 of comparator stage 26. The output of AND gate 101 is connected to one input of an OR gate 104 whose other input is connected to output 26-1 of comparison stage 26a. The output of AND gate 102 is connected directly to terminal O2. The output of AND gate 103 is connected to one input of an OR gate 105 whose second input is connected to output 26-3 of comparator stage 26. The outputs of OR gates 104 and 105 are connected, respectively, to output terminals O1 and O3. Output terminals O1, O2 and O3 are directly connected to the C1, C2, and C3 control inputs of the next higher stage.

The above-described circuit operates as follows: when the output of comparison stage 26a is a "1" signal at output 26-1, this output, signifying that the measured value exceeded the reference value, is directly transmitted through OR gate 104 to terminal O1. When a "1" signal appears at output 26-3, this signal is transmitted directly through OR gate 105 to terminal O3. If, however, a "1" signal appears at output 26-2 of comparator stage 26, all three AND gates are energized at their first input. A signal will therefore appear at the output of that AND gate whose second input is energized by the last previous stage. For example, if the output from the last previous stage indicated that the measured value exceeded the reference value, a "1" signal appears at terminal C1, AND gate 101 furnishes a "1" signal at its output, and this signal is transmitted through OR gate 104 to output O1. The conditions shown in FIG. 2 indicate the next lower stage of comparators 26 and 27 each determined that the reference value was equal to the measured value. This assumes that, at least in one of the lower stages, the upper and lower reference values were chosen to be the same. However, these conditions are permanently applied to the control inputs of the least significant stage of comparators 26 and 27 and to the control inputs of the most significant stage of comparator 28. The latter operates from left to right, that is from the most to the least significant decimal place.

Each stage of display store 14 furnishes the measured value signal corresponding to its assigned decimal place through lines 36 to comparator stages 26 and 27, to subtraction circuit 15 and to multiplexer 17. Switch 32 is connected to all stages of multiplexer 17. When it is in the position shown in FIG. 2, the measured value is transmitted through multiplexer 17 to decoder 18. It is then displayed in display 20. This is the operation when a digital display is desired.

Switch 30, whose position determines whether a comparison to a single reference value is to be made or whether it is to be determined whether the measured value lies within a predetermined range is connected to multiplexer 16 in all stages. All multiplexers 16 are interconnected by lines 50, 51, and 52.

A sign comparator 43, 44 precedes the most significant stage of comparators 26, 27 respectively. The desired sign of the reference value (plus or minus) is set at inputs 39 and 41. The sign (39) of the upper limiting reference value is also applied to subtraction circuit 15. The sign of the measured value is stored in a storage 37 associated with display store 14. It is applied to both sign comparators 43 and 44 as well as to the subtraction circuit 15. The subtraction circuit is connected through lines 48 with multiplexer stages 19, 19'. Further, the sign output of the subtraction circuit is connected directly to all multiplexer stages 19', and through an inverter 45, to all multiplexer stages 19.

A logic circuit 13 is provided for the most significant place only. Logic circuit 13 includes two OR gates 13a, 13b whose outputs are connected to the inputs of an AND gate 13c. The two inputs of OR gate 13a are connected to the outputs of sign comparator 43 signifying that the measured value is equal to the reference value and that the measured value is less than the reference value. The two inputs of OR gate 13b are connected to the outputs of sign comparator 44 which signify that the measured value is equal to the reference value or that the measured value is greater than the reference value. OR gate 13a will furnish an output if the measured value is less than or equal to the upper limiting reference value, and OR gate 13b will furnish an output signal when the measured value is equal to or greater than the lower limit reference value. AND gate 13c will therefore furnish a "1" signal when the measured value is within the range determined by the upper and lower limiting values. This signal is furnished on line 51. Similarly a signal on line 50, connected to the output signifying that the measured value is greater than the reference value of sign comparator 43, indicates that the measured value is outside of the range and greater than the upper limiting value of the range. A "1" signal on line 52 signifies that the measured value is less than the lower limiting value of the range.

If logic circuit 13 and the circuits associated with the sign of the various quantities (37,39,43,41,44,45) and switches 30 and 32 are omitted, the remaining diagram will be the correct diagram for each of the lower decimal places. The latter will therefore not be illustrated individually herein.

Comparator 28 compares the difference calculated in subtraction circuit 15 to a reference value which, in a preferred embodiment is zero. Since the sign of the difference computed in subtraction circuit 15 determines whether the reference value is greater than or less than the measured values, the difference computed by the subtraction circuit is switched to different inputs of comparator 28 (i.e. through multiplexers 19 or 19') depending upon the sign of the difference. Comparator 28 furnishes three outputs indicating that the measured value is greater than, equal to or less than the reference value. Further, the comparator stages are cascaded such that only if both the comparison result (inputs from multiplexers 19, 19') and the input from the next higher stage 28 show correspondence between both actual and reference values for the difference calculated in subtractor 15, then the output likewise switches to "actual value=reference value" (of the difference). This prevents a flickering of the lower stages during weighing-in processes as will become apparent in the discussion of the particular example below.

Figure 2B:
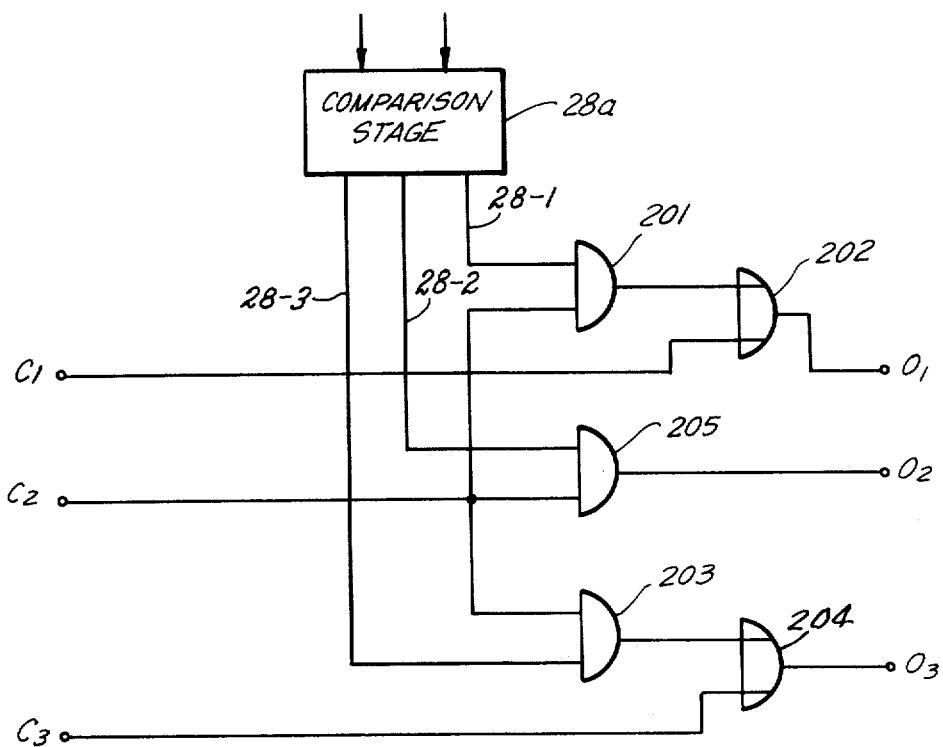
FIG. 2b same for comparator 28.

A typical comparator stage 28 is shown in FIG. 2b. It includes a comparison stage 28a in which the difference computed in subtraction circuit 15 is compared to the standard difference which is zero. Comparison stage 28a furnishes an output on line 28-1 when the comparison indicates that the measured value exceeds the reference value, an output on line 28-2 when the measured value is equal to the reference value and an output on line 28-3 when the measured value is less than the reference value. Comparator stage 28 has three control inputs C1, C2, and C3. These are connected to the outputs of the next higher stage. A "1" at terminal C1 indicates that the next higher stage found that the measured value exceeded the reference value. A "1" at input C2 indicates that equality between the measured and reference values was found in the next higher stage, while a "1" signal at control input C3 indicates that the next higher stage determined that the measured value was less than the reference value. Comparator 28 has three output terminals, $O_1$, $O_2$ and $O_3$ which are directly connected to the control inputs of the subsequent lower stage. An AND gate 201 has a first input connected to control input C2, a second input connected to line 28-1 and an output connected to the first input of an OR gate 202. The second input of OR gate 202 is directly connected to control input C1. The output of OR gate 202 is connected to output terminal $O_1$. A second AND gate 203 has a first input connected to control input C2, a second input connected to line 28-3 and an output connected to the first input of an OR gate 204. The second input of OR gate 204 is directly connected to input terminal C3. The output of OR gate 204 is connected to output $O_3$ of comparator 28. Finally, an AND gate 205 has a first input connected to line 28-2, a second input connected to control input C2 and an output connected to output terminal $O_2$ of comparator stage 28.

The operation of the circuit of FIG. 2b is as follows. If the comparison by the next higher stage indicated that the measured value exceeded the reference value, a "1" appears at output $O_1$, regardless of the outcome of the comparison carried out by comparison stage 28a. Similarly, a "1" signal appears at output $O_3$ if the comparison by the previous stage indicated that the measured value was less than the reference value. If, however, the next higher stage indicated that the measured value was equal to the reference value, that is if a "1" signal appears at control input C2, then either terminal $O_1$, $O_2$ or $O_3$ is energized depending upon whether the comparison by stage 28a indicated that the measured value was greater than, the same as or less than the reference value.

The comparators shown in FIG. 2 are commercially available by Type No. SN 7485. FIGS. 2a and 2b are included herein for ready reference.

The operation of the circuit of FIG. 2 with the comparators shown in FIGS. 2a and 2b will now be described with reference to a scale operating in three different operating modes.

In the first mode, a digital indication of the weight on the scale is desired. For this operation switch 32 is closed and the signal on line 33 switches multiplexer 17 to a "low" state.

In the "low" state, multiplexer 17 is gated so that the value stored in display store 14 is transmitted through multiplexer 17 to decoder 18 and from decoder 18 to display 20. The usual numerical display results on display 20.

In the second mode, the scale is utilized for metering, that is a substance is to be applied to the scale until a predetermined weight of the substance has been reached. This predetermined weight, herein referred to as the reference weight, is entered at input 22 which may, for example, be a microswitch, BCD switch or a keyboard. The reference value is transferred to reference store 24. The sign of the reference value will also be entered, namely into store 39. Of course for this type of weighing operation the sign will be a plus sign.

Figure 4:
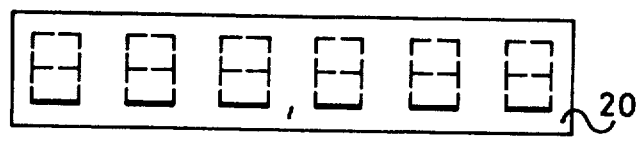
FIGS. 4-6 are examples of the analogue display for different operating conditions.

Switch 32 is opened. This causes the logic circuits in multiplexer 17 and decoder 18 to be switched such that none of the vertical segments of display 20 can be energized and that the energization of the horizontal segments takes place by transfer of data from comparator 28, through multiplexer 16, multiplexer 17, decoder 18 to display 20. Let it be assumed that a metered amount of 200,000 grams of a substance is to be obtained. The value plus 200,000 is entered into stores 39 and 24. At the beginning of the weighing, the empty vessel which is to receive substance is on the scale. After taring, the value indicated by display store 14 will be zero. In the subtraction circuit the difference "+200,000−000,000=+200,000" will be formed. The difference of +200,000 will be compared in comparator 28 to the reference value of zero and under consideration of the fact that the difference was a positive difference, the bottom output of comparator 28 (i.e. the output indicating that the measured value was less than the reference value) will carry a "1" signal while the remaining outputs will carry "0" signals. These three signals are gated through multiplexer 16 and multiplexer 17 to decoder 18 where a signal energizing the bottom horizontal segment in display 20 will result. Since this is the case for the highest stage of comparator 28, all the remaining stages will also have the bottom horizontal segment energized, as is shown in FIG. 4.

Nothing will change in the display as more substance is added to the scale until the difference between the measured value and the reference value in the highest stage of subtraction circuit 15 becomes a zero, thereby causing the highest stage of comparator 28 to furnish a "1" signal on the middle output. This will occur when 100,001 grams have been applied to the scale. In this case, the subtraction circuit will form the difference "+200,000−100,001=+099,999". Again, the output of comparator 28 is transmitted through multiplexers 16 and 17 and decoder 18 to display 20, causing the middle segments of the highest place of the display to be activated. Because of the logic circuitry of comparator 28, as shown in FIG. 2b, the lowest segments in the remaining places will remain energized.

Figure 5:
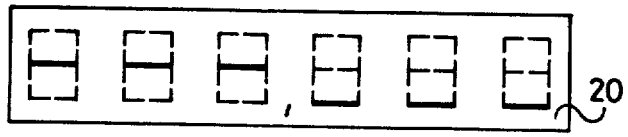
Figure 6:
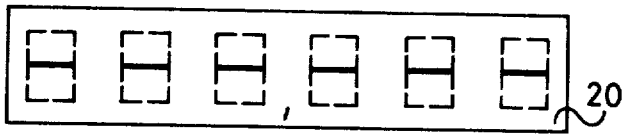

As more substance is added, the next higher place of comparator 28 will indicate equality between the measured and the reference values, causing the next middle segment to be energized also. In FIG. 5 the condition is shown wherein, for a six place reference weight, equality has been reached for the three highest places. For the above example, the display of FIG. 5 will result when 199,001 grams have been weighed, causing the difference to be 000,999. When 200,000 grams have been weighed in, the display of FIG. 6 will result, that is all middle segments will be energized. After this, if more substance is added, comparator stage 28 of the least significant decimal place will furnish a "1" signal at the output indicating that the measured value exceeds the reference value. Correspondingly, the top horizontal segments of the least significant place will be energized. As more substance is added, the top horizontal segment of additional places in the display, starting with the least and working towards the most significant place, will be energized.

If, just before the reference value has been reached, the operator prefers a digital display for finishing the weighing under numerical control, he must simply close the switch 32 and the standard numerical display will appear on display 20.

In the third mode of operation, it is desired to see whether the weight of the substance falls within a predetermined range having an upper and lower limiting value. First, the desired upper and lower limit values are entered into stores 22, 24, 39 and 23, 25, 41 respectively. Switch 30 is switched to the range control position. In this position, multiplexers 16 are controlled to transmit data from the outputs of comparators 26 and 27 through lines 50, 51 and 52 to multiplexer 17. Additionally, switch 32 is opened so that only the horizontal segments of the display will be energized.

During weighing, each comparator stage 26, as shown in FIG. 2a, compares its associated digit of the reference and the measured values, furnishes the comparison output and, through its associated logic circuitry, takes into consideration also the result of the comparison by the next lower stage, as described above. If the measured value is within the range determined by the upper and lower limiting values, comparator 43 will furnish a signal on its lowest output signifying that the measured value is less than the reference value (or, at the limit equal to the reference value), while comparator 44 will furnish a signal at its top output indicating that the measured value exceeds the reference value (or, again, at the limit is equal to the reference value). Under these conditions, an output will appear on line 51 which will cause all middle segments in display 20 to be energized. This results in the display shown in FIG. 6. If the measured value exceeds the upper limiting value, even only by the small amount represented by the least significant decimal stage, comparator 26 of this stage will furnish a "1" signal on its top output indicating that the measured value exceeds the reference value. Since all more significant comparator stages at this point carry the signal that the measured value is equal to the reference value, the signal from the least significant place will be transmitted through the more significant comparator stages 26, 43 and all top horizontal segments for each place in the display are energized. Similarly, if, in the least significant place the weight is less than the minimum limiting value, this fact will be transmitted through the comparator stages 27, 44 and all bottom horizontal segments of the display are energized. This is shown in FIG. 4.

In the above description the three modes of operation (digital, metering to a predetermined reference value, determination if the substance weight is within a predetermined range) took place on a single scale. It is of course possible that only one of the modes according to the present invention be available on any given scale. If the scale is to be equipped only to allow the metering mode, comparators 26 and 27 as well as comparators 43 and 44, logic circuit 13 multiplexer 16 and switch 30 can be eliminated. If only the range operation is required, the subtraction circuit 15, multiplexers 19, 19', comparator 28 and multiplexer 16 and switch 30 can be omitted.

The range control mode can also be modified so that displays corresponding to FIG. 5 results. In other words, only those top or bottom horizontal segments for which the measured and reference value do not correspond would be illuminated. For example, the display of FIG. 5 would result for an actual measured value of 195,001 grams if the lower limiting value of the range were 196,000 grams. One could therefore estimate rapidly how far above the upper limit or below the lower limit the actual measured quantity could be at the most. However, this type of operation would require a substantial amount of additional equipment.

In another variation of operation possible with the basic circuit of FIG. 2, switch 32 and logic circuit 13 can be dispensed with. In this variation the switching from the numerical digital display to the quasi-analogue display occurs automatically.

This variation is shown in dashed lines and comprises an OR gate 53 having a first input connected to line 50, a second input connected to line 52 and an output line 55 connected to multiplexer 17 which, in the previous embodiments, was controlled by switch 32.

As was the case with the range control operation described above, the desired upper and lower limit reference values are entered into storages 24 and 25. When comparator 43 furnishes a signal indicating that the measured value exceeded the upper limit or, alternatively, if comparator 44 furnishes a signal indicating that the measured value was less than the lower limit of the defined range, line 50 or line 52, respectively, carry a "1" signal which is transmitted through OR gate 53 to line 55 and multiplexer 17. This controls the multiplexer such that the signal on line 50' or line 52' is transmitted to decoder 18. The output of decoder 18 then energizes either the upper segments of the display or the lower segments, as appropriate.

If, however, the measured value was within the range, no signal is furnished on line 55 and multiplexer 17 passes the signals from display store 14 to decoder 18, thereby creating the normal numerical display in display 20.

Figure 3:
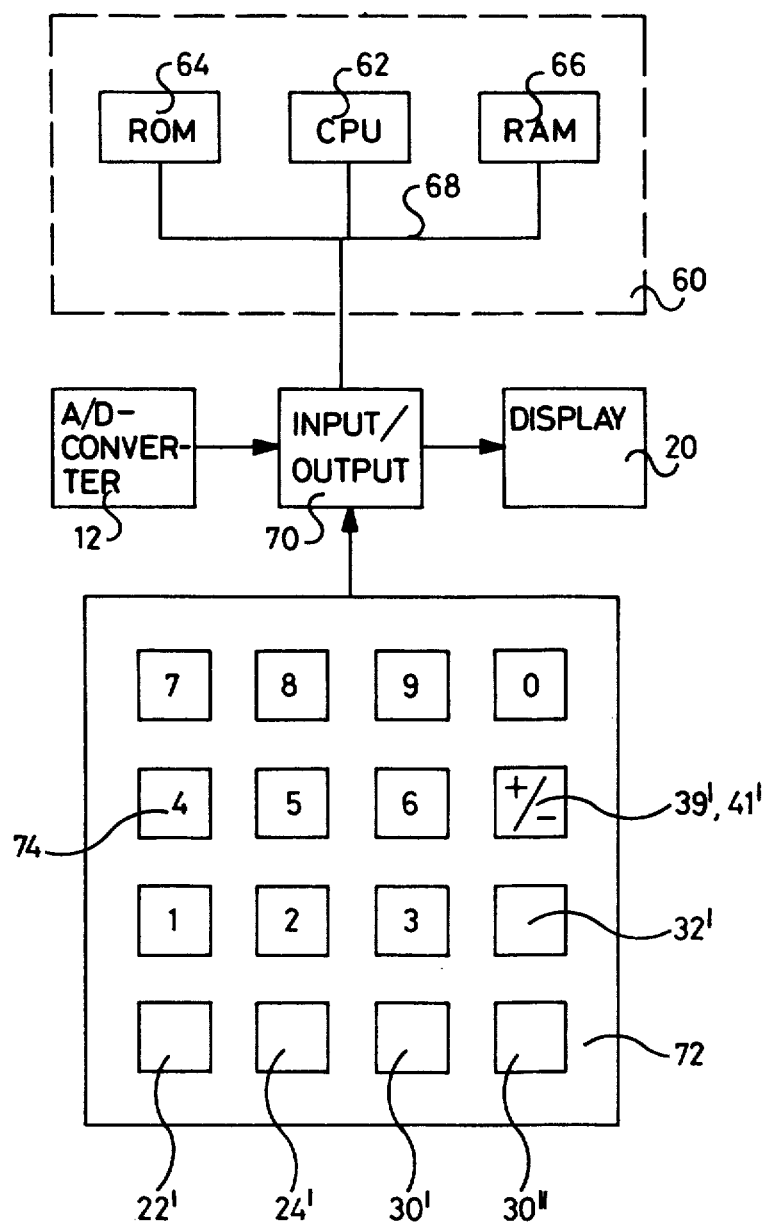
FIG. 3 is an embodiment utilizing a microcomputer.

FIG. 3 shows an embodiment of the electronic scale of FIG. 2, but utilizing a microcomputer. Microcomputer 60 includes a central processing unit 62, a read only memory 64, a random access memory 66, as well as data and address lines 68. The program for the desired mode of operation is selected by the operator by pressing key 30' if the metering mode is desired, 30'' if the range control mode is desired, or key 32' which selects either the normal digital display or the metering or range display. The keys are part of a keyboard 72, which further has sign keys 39', 41' and a key 22' and 24' for accessing the corresponding storage locations in the random access memory. Keyboard 72 further comprises keys with numerical values for entering the reference values into the random access memory 66. The output of analogue-digital converter 12, which is the measured value in digital form, is fed into the input/output device 70 whose output controls the display 20 and which also controls the transfer of data from keyboard 72 into microcomputer 60.

Various combinations and variations of the above described operating modes are readily apparent. For example, for the range control mode, it would be possible to provide for switching to a digital display when the measured value is within the range, while maintaining the quasi-analogue display for indicating that the measured value is outside of the range. This again would require at least some additional equipment in the case of a standard circuit or additional storage capacity for the program of the microcomputer.

While the invention has been illustrated in preferred embodiments, it is not to be limited to the circuits and structures shown, since many variations thereof will be evident to one skilled in the art and are intended to be encompassed in the present invention as set forth in the following claims.

I claim:

1. In a measuring system having display means for furnishing a digital display of the measured value, said display means having a set of horizontal segments including a first and second subset forming, respectively, a first and second horizontal line of said digital display, and a set of vertical segments including a first and second subset respectively forming a first and second vertical line in said digital display;
apparatus for operating said display means to furnish a display indicative of the relationship of said measured value to a desired value, said apparatus comprising input means for inputting said desired value to said system;
means connected to said input means for comparing said measured value to said desired value and furnishing a first or second comparator output signal when said measured value has a first or second predetermined relationship to said desired value, respectively;
means for temporarily deactivating a selected one of said segment sets and
for activating said first or said second subset of said remaining one of said sets in response to said first or second comparator output signal, respectively.

2. A system as set forth in claim 1, wherein said selected set is said set of vertical segments and said remaining set is said set of horizontal segments.

3. A system as set forth in claim 2, wherein said set of horizontal segments comprises a bottom, middle, and top segment for each place of said digital display; wherein said apparatus further comprises display storage means for storing said measured value and reference storage means for storing said desired value; wherein said comparator signal furnishing means comprises first comparator means connected to said reference storage means and said display storage means for furnishing a first, second and third comparator output signal when said measured value is, respectively, less than, equal to, or greater than said desired value; and wherein said apparatus further comprises horizontal segment activator means for activating said bottom, middle and top segments in response to said first, second, and third comparator output signals respectively.

4. A system as set forth in claim 2, wherein said input means comprises means for inputting a lower limit and an upper limit value together defining a desired range, and first and second input storage means for storing said lower and upper limit values, respectively;
wherein said display means further comprises display storage means for storing said measured value; and
wherein said comparator output signal furnishing means comprises in-range signal furnishing means connected to said first and second input storage means and said display storage means for furnishing an in-range signal only when said measured value is within said desired range.

5. A system as set forth in claim 4, wherein said horizontal segments comprise bottom, top, and middle segments; and
wherein said activating means comprises means for activating said middle segments in response to said in-range signal.

6. A system as set forth in claim 2, wherein said comparator output signal furnishing means and said activating means are embodied in a microcomputer having a read only memory, a central processing unit, and a random access memory.

7. A system as set forth in claim 3, wherein said first comparator means comprises subtraction means for subtracting said measured value from said desired value and furnishing a difference signal corresponding to the difference therebetween, said difference signal comprising a sign signal and a difference amplitude signal, and difference comparator means connected to said subtraction means for comparing said difference signal to a reference value signal and furnishing said first, second and third comparator output signals at least in part in dependence on said comparison.

8. A system as set forth in claim 7, wherein said measured value and said desired value each comprises a predetermined plurality of places, ranging from a most significant place to a least significant place; wherein said difference comparator means comprises a plurality of difference comparators, corresponding in number to said predetermined plurality of places; and wherein said display means comprises a predetermined plurality of places corresponding in number to said predetermined plurality of places in said desired and measured values.

9. A system as set forth in claim 8, wherein each of said plurality of difference comparators has a first, second and third control input connected, respectively, to receive said first, second and third comparator output signal from the difference comparator associated with the next higher place, and a first and second signal input connected to receive, respectively, said difference signal and said reference value signal, each of said difference comparators comprising means for furnishing said first, second and third comparator output signals under control of said difference signal only in the presence of a signal at said second control input and in correspondence to signals at said first or third control input independently of said difference signal.

10. A system as set forth in claim 4, further comprising means for furnishing an out-of-range signal when said measured value is outside said desired range, and means for automatically deactivating said horizontal segments and thereby said digital display in response to said out-of-range signal.

11. A system as set forth in claim 5, further comprising means for furnishing a first out-of-range signal when said measured value is less than said lower limit value and a second out of range signal when said measured value exceeds said upper limit value; and wherein said activating means comprises means for activating said top segments in response to said second out-of-range signal and said bottom segments in response to said first out-of-range signal.

12. A system as set forth in claim 11, wherein said digital display comprises a plurality of places, each of said places having a top, middle and bottom segment; and wherein said activating means comprises means for activating all of said bottom segments in response to said first out of range signal, all of said middle segments in response to said in-range signal and all of said top segments in response to said second out-of-range signal.

13. A system as set forth in claim 12, wherein said in-range signal furnishing means comprises upper limit comparator means for comparing said measured value to said upper limit value and furnishing a first, second and third upper limit comparator output signal when said measured value is, respectively, greater than equal to and less than said upper limit value, lower limit comparator means for comparing said measured value to said lower limit value and furnishing a first, second and third lower limit comparator output signal when said measured value is, respectively, greater than, equal to or less than said lower limit value, and logic circuit means connected to said upper limit comparator means and said lower limit comparator means for furnishing said in-range signal in the simultaneous absence of said first upper limit comparator output signal and said third lower limit comparator output signal.

14. A system as set forth in claim 13, wherein said upper limit comparator means comprises a plurality of upper limit comparators, one for each place of said display; wherein said lower limit comparator means comprises a plurality of lower limit comparators, one for each place in said display; wherein each of said upper limit comparators has a first, second and third control input connected, respectively, to the first, second and third output of the upper limit comparator associated with the next lower place, and a first and second signal input respectively connected to the corresponding place in said display storage means and said second reference storage means, each of said upper limit comparators comprising means for furnishing a first and third upper limit comparator output signal when said measured value is, respectively, greater than or less than said upper limit value, or in the presence of a control signal at said first or third control input respectively when said measured value is equal to said upper limit value, and furnishing said second upper limit comparator output signal in the presence of a signal at said second control input when said measured value is equal to said upper limit value.

15. A system as set forth in claim 14, wherein said logic circuit means comprises logic circuit means connected to the comparator means associated with the highest place only.

16. A system as set forth in claim 15, wherein said measured value, said upper limit value and said lower limit value each have an associated sign; further comprising measured sign storage means for storing the sign of said measured value, and upper and lower limit sign storage means for storing, respectively, the sign associated with said upper and said lower limit value, upper limit sign comparator means having a first, second and third control input connected to the first, second and third output of said upper limit comparator means associated with said highest place, a first and second signal input connected, respectively, to said measured sign storage means and said upper limit sign storage means, and lower limit sign comparator means having a first, second and third control input connected to a first, second and third output of said lower limit comparator means, a first and second signal input connected to said measured sign storage means and said lower limit sign storage means respectively, and a first, second and third output; and wherein said logic circuit means comprises logic circuit means having a first and second input connected to said first and second output of said upper sign comparator means and a third and fourth input respectively connected to said third and second output of said lower sign comparator means.

17. In a measuring system having display means for furnishing a digital display of the measured value, said display means having a set of horizontal segments including a first and second subset forming, respectively, a first and second horizontal line of said digital display, and a set of vertical segments including a first and second subset respectively forming a first and second vertical line in said digital display;

a method for operating said system to indicate only the relationship of said measured value to a desired value, comprising the steps of temporarily deactivating a selected one of said sets;

comparing said measured value to said desired value and furnishing a first or second comparator output signal when said measured value has a first or second predetermined relationship to said desired value, respectively;

and activating said first or said second subset of the remaining set in response to said first and second comparator output signal, respectively, whereby a line in a predetermined position in said display is indicative of a predetermined relationship of said measured to said desired value.

18. A method as set forth in claim 17, wherein said selected set of segments comprises said set of vertical segments and said remaining set comprises said set of horizontal segments.

19. A method as set forth in claim 18, wherein said display has a plurality of places; wherein said plurality of horizontal segments comprises a top, bottom, and middle segment for each of said places; wherein said measured value is a digital number having a plurality of places corresponding in number to said plurality of places in said display; and wherein said method further comprises the steps of furnishing a desired value signal corresponding to the desired value of the substance being measured, comparing said measured value to said desired value and furnishing a first, second and third comparator output signal if said measured value is, respectively, less than, equal to, or greater than said desired value, and activating said lower segments, said middle segments, and said top segments, in response to said first, second and third comparator output signals respectively.

20. A method as set forth in claim 19, wherein said desired value constitutes an upper limit value; further comprising the steps of furnishing a lower limit value, said upper and lower limit values together defining a desired range, comparing said measured value to said upper and lower limit values and furnishing an in-range signal when said measured value is in said desired range, and activating all of said middle segments in response to said in-range signal.

* * * * *